US006396228B2

(12) United States Patent
Guille et al.

(10) Patent No.: US 6,396,228 B2
(45) Date of Patent: May 28, 2002

(54) MOTOR OPERATOR FOR A CIRCUIT BREAKER

(75) Inventors: Serge Guille, Essigny le Grand; Marc Burlet, Saint Quentin, both of (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/731,380

(22) Filed: Dec. 6, 2000

(30) Foreign Application Priority Data

Mar. 17, 2000 (FR) .......................................... 00 03488

(51) Int. Cl.[7] .......................................... H02P 3/00
(52) U.S. Cl. .......................... 318/434; 318/246; 361/31
(58) Field of Search ................................ 318/246, 251, 318/252, 280, 281, 286, 434, 443; 335/14; 361/31; 307/112, 139, 143; 340/648, 664

(56) References Cited

U.S. PATENT DOCUMENTS 4,064,546 A * 12/1977 Domanski .................. 340/664
5,005,382 A * 4/1991 Duve ......................... 318/281
5,229,695 A * 7/1993 Tsuda et al. ................ 318/434
5,381,121 A 1/1995 Peter et al.

FOREIGN PATENT DOCUMENTS

EP 0 038 291 A 10/1981
EP 0 572 970 A 12/1993

* cited by examiner

*Primary Examiner*—Khanh Dang
(74) *Attorney, Agent, or Firm*—Cantor Colburn LLP

(57) ABSTRACT

In the three-terminal motor operator of the present invention, current flowing through half coil causes the rotor to rotate in a first direction, and current flowing through half coil causes the rotor to rotate in a second direction. Rotation of the rotor in the first direction causes the mechanical linkage to move the circuit breaker operating handle towards its “off” or “reset” positions. Rotation of the rotor in the second direction causes the mechanical linkage to move the circuit breaker operating handle towards its “on” position. Pressing the “off” button causes electrical current to flow through the half coil until the circuit is broken by the limit switch. Pressing the “on” button causes electrical current to flow through the half coil until the circuit is broken by the limit switch.

8 Claims, 4 Drawing Sheets

MOTOR OPERATOR FOR A CIRCUIT BREAKER

CROSS-REFERENCE TO RELATED APPLICATIONS

This application claims the benefit of the application Ser. No. 0003488 filed Mar. 17, 2000 in France, which is incorporated herein by reference.

BACKGROUND OF THE INVENTION

This invention relates to a motor operator, and, more particularly, to a motor operator for circuit breakers.

The use of motor operators to allow the motor-assisted operation of electrical circuit breakers is well known. A motor operator is typically secured to the top of a circuit breaker housing. A lever within the motor operator mechanically interacts with a circuit breaker operating handle, which extends from the circuit breaker housing. The lever is operatively connected to a motor within the motor operator. The motor drives the lever, which, in turn, moves the operating handle to operate the circuit breaker. The operating handle is moved between "on", "off", and "reset" positions, depending on the rotational direction of the motor.

A plurality of buttons external to the motor operator controls electrical current to the motor. The rotational direction of the motor is changed depending on which of these buttons is selected by operating personnel. Thus, the operating personnel can select one button to place the operating handle in the "on" position, and another button to place the operating handle in the "off" or "reset" positions.

When the handle is moved to the "on" position, electrical contacts within the circuit breaker are brought into contact with each other, allowing electrical current to flow through the circuit breaker. When the handle is moved to the "off" position, the electrical contacts are separated, stopping the flow of electrical current through the circuit breaker. When the handle is moved to the "reset" position, an operating mechanism within the circuit breaker is reset, as is necessary after the operating mechanism has tripped in response to an overcurrent condition in the electrical circuit being protected by the circuit breaker.

Typically, the motor used within such motor operators is a series motor, as shown in FIG. 1. Series motors are so called because the field coils of the motor are electrically in series with the rotor coil. FIG. 2 is a diagram of the stator of a series motor. The field coils are wound around magnetic pole pieces, called shoes. The field coils and shoes produce the main magnetic field. When current passes through the field coils, one shoe becomes a north pole while the other becomes a south pole. Electrical connection between the field windings and the rotor windings (not shown) is made by brushes (not shown) in contact with a commutator (not shown) of the rotor, as is known in the art.

In order to change the rotational direction of a series motor, the direction of the current flow to either the rotor or the field must be reversed. A typical arrangement for reversing the current flow is shown in the circuit diagram of FIG. 3. In this arrangement, two double-throw type switches are arranged to operate the motor in two directions, one to position the breaker in the "on" position, the other to position the breaker in the "off" and "reset" positions. As can be seen in FIG. 3, this arrangement requires five electrical connections to be established at the motor operator. It would be desirable to reduce the number of electrical connections in order to reduce the amount of time needed to install and remove the motor operator.

BRIEF SUMMARY OF THE INVENTION

In an exemplary embodiment of the invention, a motor operator for a circuit breaker has a series motor, which includes a first external terminal coupled to a first half inductor and a second external terminal coupled to a second half inductor. A third external terminal is coupled to a rotor. The first external terminal and the third external terminal form a first electric path, and the second external terminal and the third external terminal form a second electric path.

DETAILED DESCRIPTION OF THE INVENTION

Figure 1:
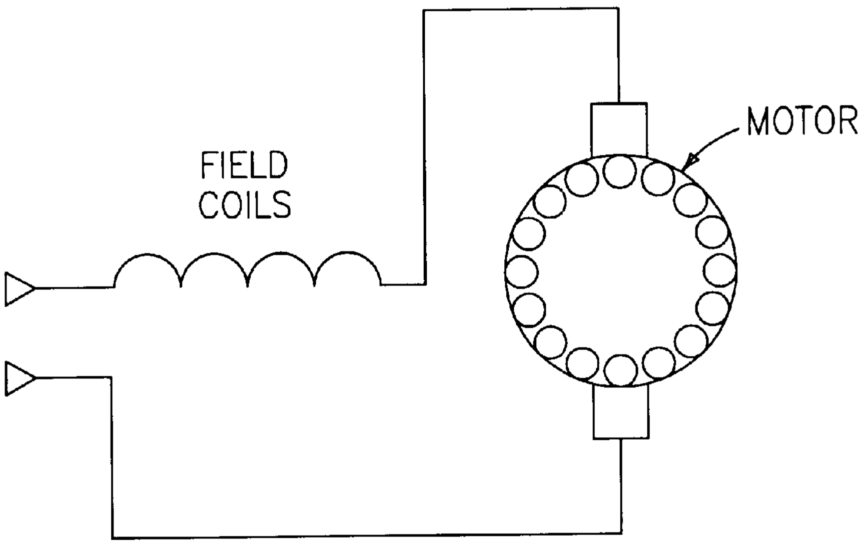
FIG. 1 (PRIOR ART)
FIG. 1 is a prior art series motor.
Figure 2:
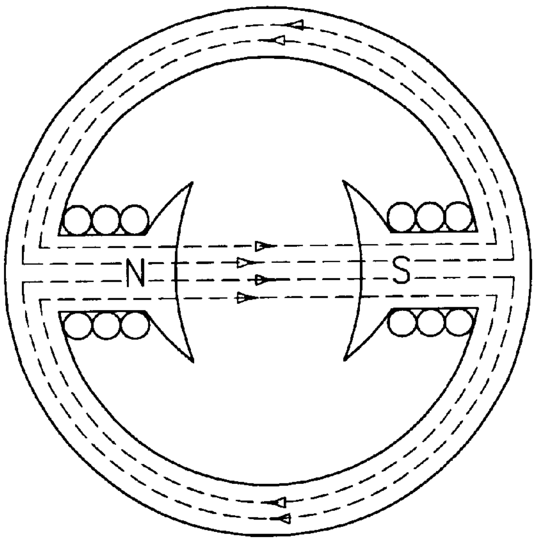
FIG. 2 (PRIOR ART)
FIG. 2 is a stator in the prior art series motor of FIG. 1.
Figure 3:
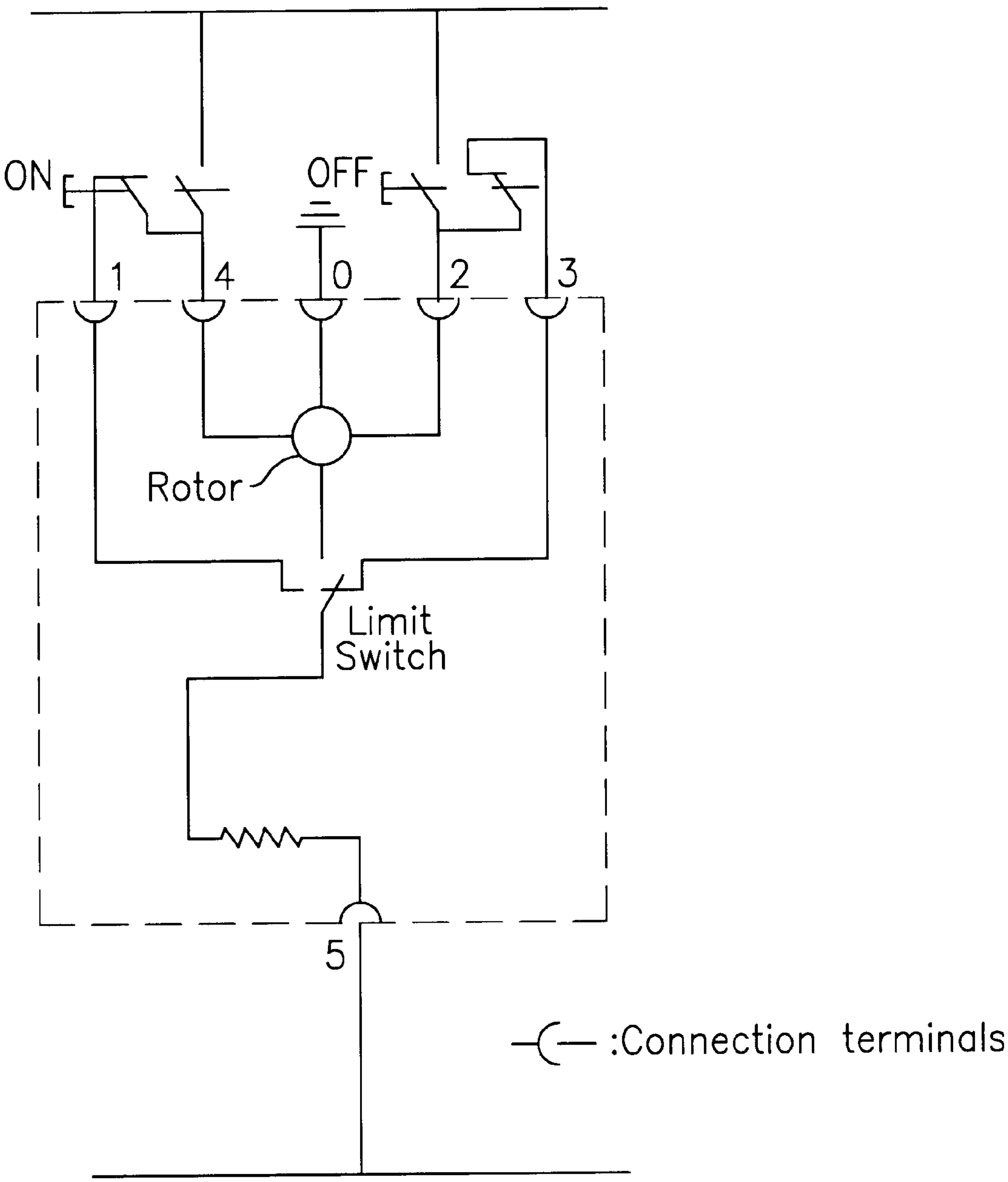
FIG. 3 (PRIOR ART)
FIG. 3 is a circuit diagram of a prior art motor operator having five connection terminals.
Figure 4:
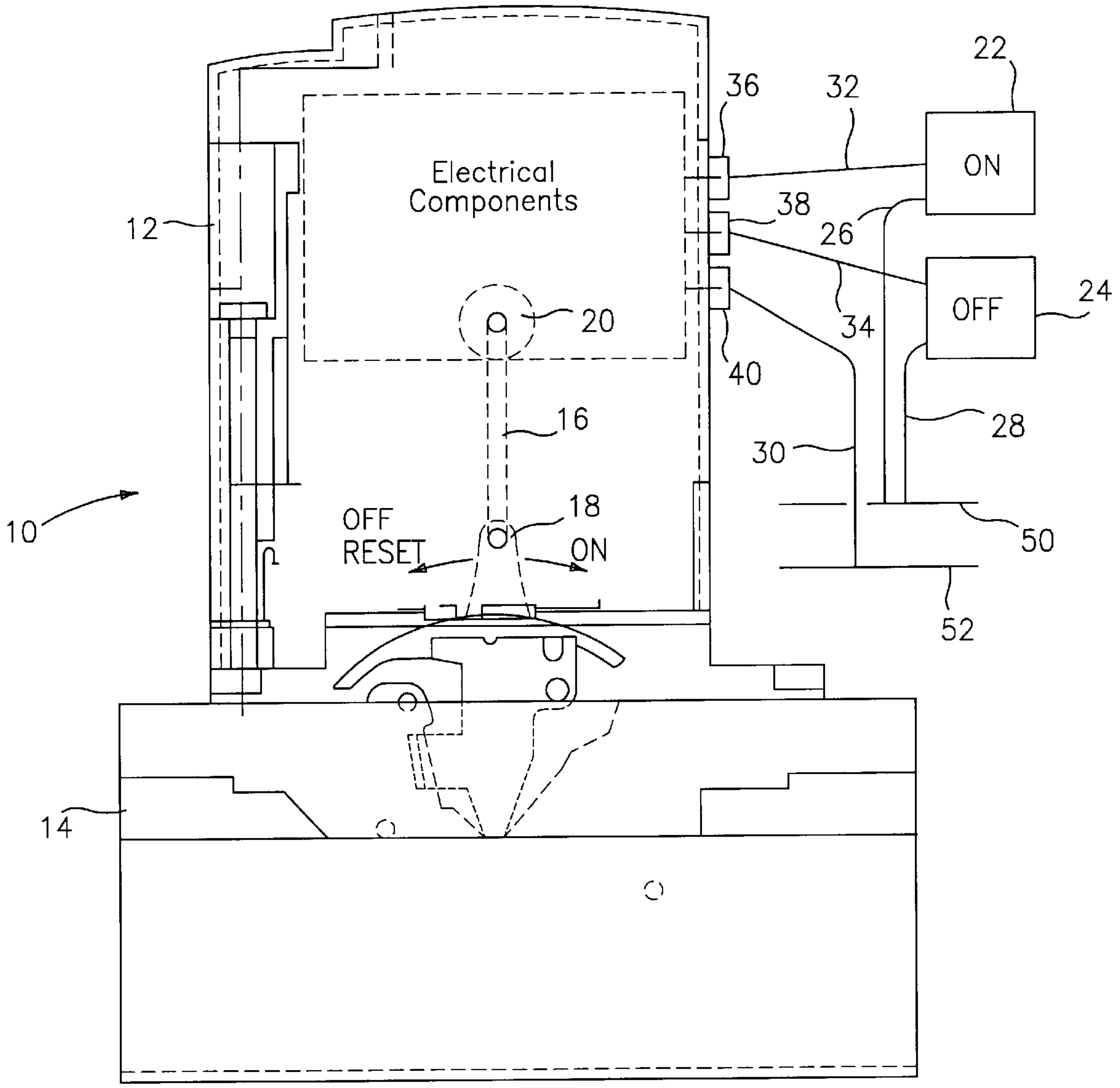
FIG. 4 is a schematic view of a three-terminal motor operator of the present invention.

Referring to FIG. 4, a schematic view of a three-terminal motor operator is generally shown at 10. The three-terminal motor operator 10 includes a housing 12 that is mounted on top of a molded case circuit breaker 14. A mechanical linkage 16 within the motor operator 10 mechanically interacts with a circuit breaker operating handle 18, which extends from circuit breaker 14. The mechanical linkage 16 is operatively connected to a series motor 20 within the motor operator 10. The series motor 20 drives the mechanical linkage 16, which, in turn, moves the operating handle 18 between "on", "off", and "reset" positions, depending on the rotational direction of the series motor 20.

"On" and "Off" buttons 22, 24 control the flow of electrical current to the series motor 20. Buttons 22, 24 are located remotely from the motor operator 10. Operating power is supplied by power supply lines 50 and 52. Wires 26 and 28 are coupled to power supply line (first power source) 50, and a wire 30 is coupled to power supply line (second power source) 52. Wires 26 and 28 electrically connect to the "on" and "off" buttons 22 and 24, respectively. Extending from "on" and "off" buttons 22 and 24 are wires 32 and 34, which connect to first and second connection terminals 36 and 38 on the motor controller housing 12. Wire 30 connects to a third connection terminal 40 on the motor controller housing 12.

The rotational direction of the series motor 20 is changed depending on whether the "on" or "off" button is selected. Selection of the "off" button 24 causes the series motor 20 to rotate in a first direction, which drives the mechanical linkage 16 to position the operating handle 18 towards the "off" or "reset" positions. Once the operating handle 18 is in the "off" or "reset" position, a limit switch (not shown) stops the rotation of the motor 20. Similarly, selection of the "on" button 22 causes the series motor 20 to rotate in a second direction, which drives the mechanical linkage 16 to position the operating handle 18 towards the "on" position. Once the operating handle 18 is in the "on" position, the limit switch stops the rotation of the motor 20.

When the circuit breaker operating handle 18 is moved to the "on" position, electrical contacts (not shown) within the circuit breaker are brought into contact with each other, allowing electrical current to flow through the circuit breaker 14. When the operating handle 18 is moved to the "off" position, the electrical contacts are separated, stopping the flow of electrical current through the circuit breaker 14. When the operating handle 18 is moved to the "reset" position, an operating mechanism (not shown) within the circuit breaker 14 is reset, as is necessary after the operating mechanism has tripped in response to an overcurrent condition in the electrical circuit being protected by the circuit breaker 14. Construction and operation of the circuit breaker is well known in the art.

Referring to FIG. 4, a circuit diagram of the motor operator 10 is shown. The first terminal 36 is connected to the single-throw type "ON" switch 22 via wire 34. The "ON" switch 22 in turn is connected to power supply line 50 via wire 26. The second terminal 38 is connected to the single-throw type "OFF" switch 24 via wire 34. The "OFF" switch 24 in turn is connected to the power supply line 50 via wire 28. The third terminal 40 connected to power supply line 52 via wire 30. A resistor (not shown) may be added between the third terminal 40 and the power supply line 52, as is known in the art.

Internal to the motor operator 10 is the series motor 20, which includes half-coils (half-inductors) 54 and 56 and rotor 58. Half coils 54 and 56 are each wound around a plurality of shoes (not shown) in the series motor 20. Also internal to the motor operator 10 is a limit switch 60, which is electrically connected between the half-coils 54 and 56 and the rotor 58. One end of half-coil 54 is coupled to the terminal 36. The other end of the half-coil 54 is connected to a contact 62 of limit switch 60. One end of half-coil 56 is coupled to the second terminal 38. The other end of the half-coil 56 is connected to a contact 64 of limit switch 60. The third terminal 40 is coupled to the rotor 58 via brushes (not shown). The rotor 58 is further coupled via brushes (not shown) to a movable contact arm 66 within the limit switch 60. The rotor 58 and the limit switch 60 are mechanically coupled to the mechanical linkage 16 (FIG. 4) in a manner known in the art.

Figure 5:
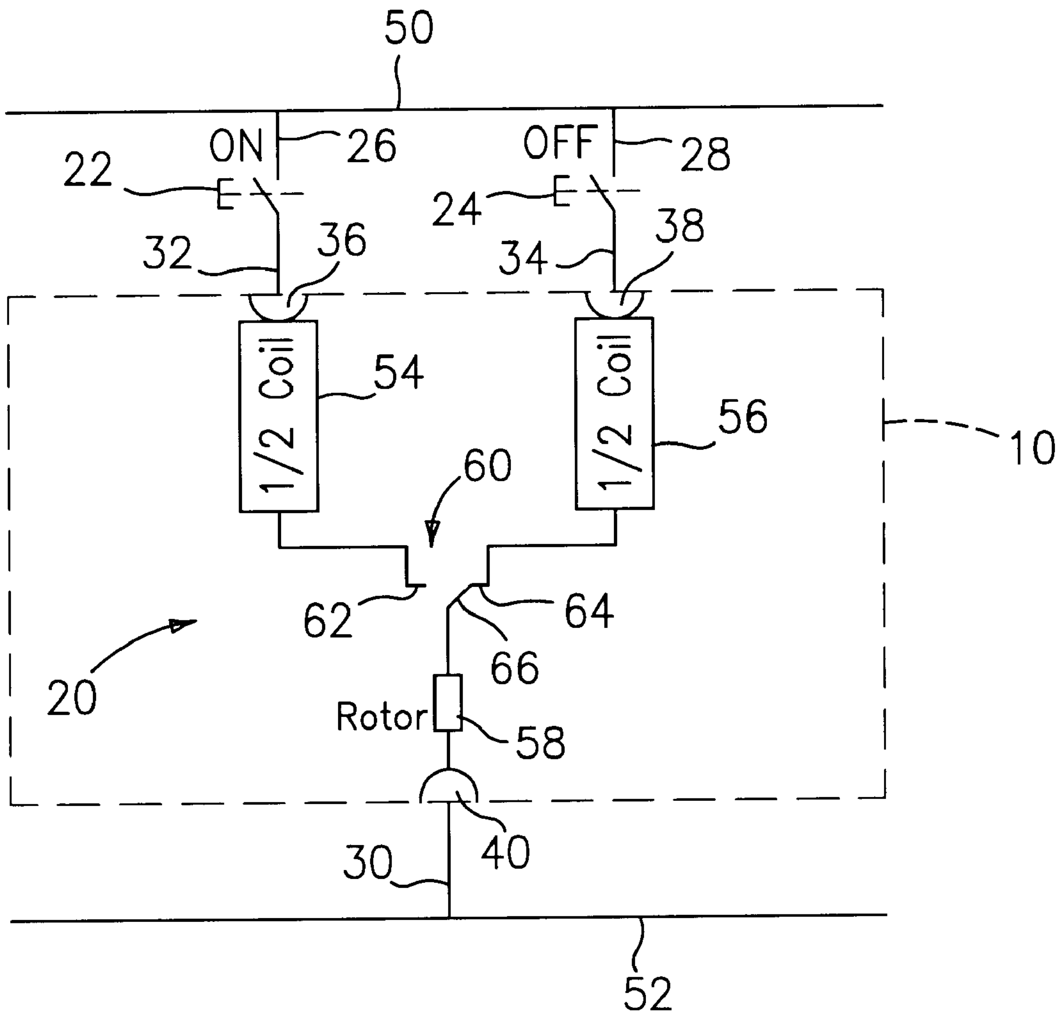
FIG. 5 is a circuit diagram of the motor operator of FIG. 4.

Referring to FIGS. 4 and 5, if the "off" button 24 is pressed, a first electrical path (circuit) is formed including the half coil 56, the contact 64, the movable contact arm 66 and the rotor 58. The half coil 56 is wound around the plurality of shoes (not shown) within the series motor 20 in a manner such that current flowing through half coil 56 causes a magnetic field that rotates the rotor 58 in a first direction. Rotation of the rotor 58 in the first direction causes the mechanical linkage 16 to move the circuit breaker operating handle 18 towards its "off" or "reset" positions. Once the operating handle 18 reaches the "off" or "reset" position, the mechanical linkage 16 causes the movable contact arm 66 of the limit switch 60 to move into contact with contact 62, breaking the flow of electrical current through half coil 56 and stopping rotation of the rotor 58.

With the movable contact arm 66 in contact with contact 62, pressing the "on" button 24 creates a second electrical path (circuit) including the half coil 54, the contact 62, the movable contact arm 66 and the rotor 58. The half coil 54 is wound around the plurality of shoes (not shown) in the series motor 20 in a manner such that current flowing through half coil 54 causes a magnetic field that rotates the rotor 58 in a second direction. Rotation of the rotor 58 in the second direction causes the mechanical linkage 16 to move the circuit breaker operating handle 18 towards its "on" position. Once the operating handle 18 reaches the "on" position, the mechanical linkage 16 causes the movable contact arm 66 of the limit switch 60 to move into contact with contact 64, breaking the flow of electrical current through half coil 54 and stopping the rotation of the rotor 58.

As shown in FIGS. 4 and 5, the motor operator of the present invention requires only three electrical connections to be established. This in an improvement over the motor operators of the prior art, which require five electrical connections. By reducing the number of electrical connections, the motor operator of the present invention reduces the amount of time needed to install and remove the motor operator.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A motor operator for a circuit breaker, the motor operator comprising:

a series motor including,
  a first half coil coupled to a first external terminal,
  a second half coil coupled to a second external terminal, and
  a rotor coupled to a third external terminal, wherein said first external terminal and said third external terminal form a first electric path, and said second external terminal and said third external terminal form a second electric path.

2. The motor operator of claim 1, further comprising:

a limit switch including,
  a first contact coupled to said first half coil,
  a second contact coupled to said second half coil, and
  a movable contact arm coupled to said rotor for alternately contacting said first contact and said second contact.

3. The motor operator of claim 1, further comprising:

a first single throw switch for coupling said first terminal to a power source.

4. The motor operator of claim 3, further comprising:

a second single throw switch for coupling said second terminal to said power source.

5. A motor operated circuit breaker comprising:

a motor operator, including:
  a mechanical linkage, and
  a series motor including,
    a first half coil electrically coupled to a first external terminal,
    a second half coil electrically coupled to a second external terminal, and
    a rotor electrically coupled to a third external terminal, wherein said first external terminal and said third external terminal form a first electric path, and said second external terminal and said third external terminal form a second electric path, said rotor being operatively coupled to said mechanical linkage; and an operating handle, said operating handle being operatively coupled to said mechanical linkage, wherein electrical current through said first electric path causes said operating handle to move in a first direction and electrical current through said second electric path causes said operating handle to move in a second direction.

6. The motor operated circuit breaker of claim 5, wherein said motor operator further includes:

a limit switch including, a first contact coupled to said first half coil, a second contact coupled to said second half coil, and a movable contact arm coupled to said rotor for alternately contacting said first contact and said second contact.

7. The motor operated circuit breaker of claim 5, further comprising:

a first single throw switch for coupling said first terminal to a power source.

8. The motor operated circuit breaker of claim 7, further comprising:

a second single throw switch for coupling said second terminal to said power source.

* * * * *